United States Patent Office 3,621,642
Patented Nov. 23, 1971

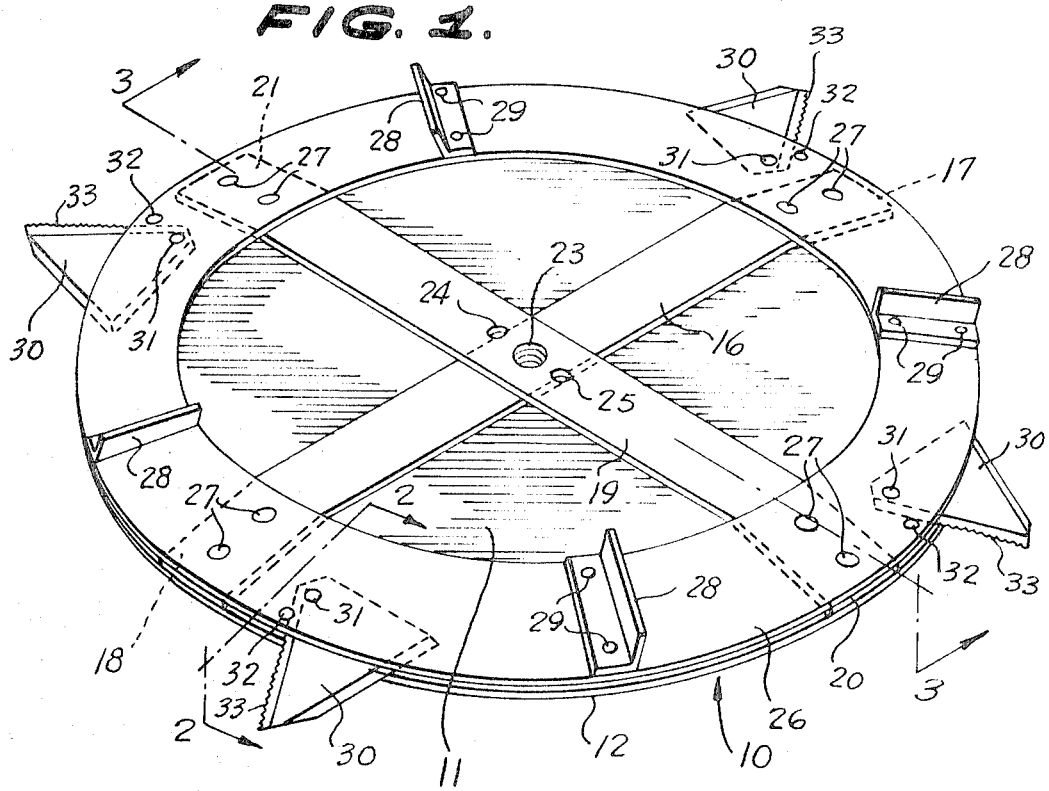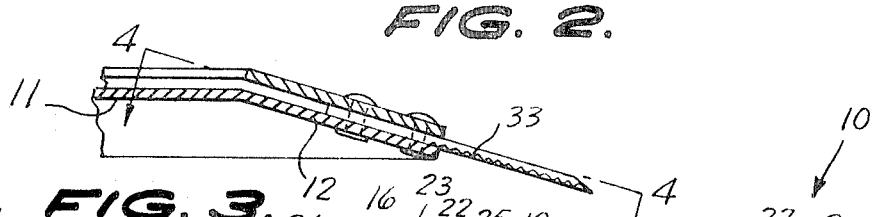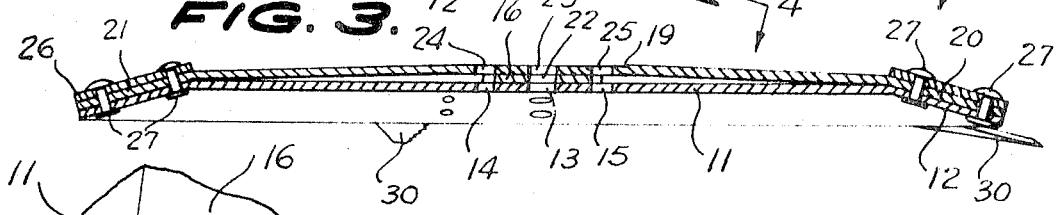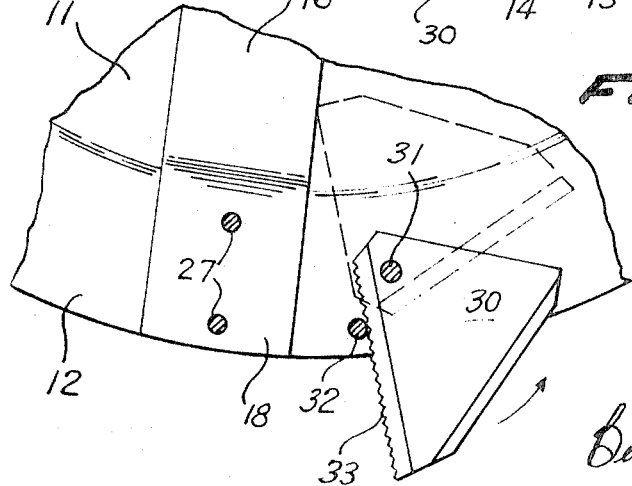

3,621,642
ROTARY CUTTER HEAD ASSEMBLY FOR LAWN MOWERS
Harry A. Leake, Jr., Rte. 1, Box 143,
Shawsville, Va. 24162
Filed Oct. 9, 1970, Ser. No. 79,422
Int. Cl. A01d 55/18
U.S. Cl. 56—295                          5 Claims

ABSTRACT OF THE DISCLOSURE

A rotary cutter head assembly for lawn mowers in which a generally flat disk is provided with an integral downwardly sloping annular ring. A pair of crossed bars are arranged perpendicularly to each other and extend radially outwardly to the outer edge of the disk. The bars have downwardly sloping outer end portions contacting the downwardly sloping annular ring on the disk. A downwardly sloping annular ring having a diameter the same as the downwardly sloping annular ring formed on the disk is arranged in spaced parallel relation thereto contacting the upper faces of the bars. The two annular disks are secured together with rivets passing through the ends of the bars. Upstanding air impeller members are secured to the upper surface of the annular disk. A plurality of cutter blades are pivotally mounted between the annular rings for movement to a position between the annular rings when striking an unyielding object. Centrifugal force normally holds the cutter blades in extended position against a stop provided a limit the movement of the cutter blades outwardly while the bars are positioned to serve as a stop to limit the movement of the blades inwardly.

BACKGROUND OF THE INVENTION

Field of the invention

The present invention relates to rotary lawn mowers of the type which includes cutter blades which rotate on a vertical axis.

SUMMARY OF THE INVENTION

The present invention is directed to a rotary cutter head assembly in which cutter blades are pivotally mounted in the assembly so as to be retractable when striking an unyielding object and which move centrifugally outwardly to cutting position against a stop.

The primary object of the invention is to provide a rotary cutter head assembly in which the cutter blades can retract on impact with an unyielding object.

Other objects and advantages will become apparent in the following specification when considered in light of the attached drawings.

BRIEF DESCRIPTION OF THE DRAWINGS

FIG. 1 is a perspective view of the invention;
FIG. 2 is an enlarged fragmentary transverse sectional view taken along the line 2—2 of FIG. 1, looking in the direction of the arrows;
FIG. 3 is a transverse sectional view taken along the line 3—3 of FIG. 1, looking in the direction of the arrows; and
FIG. 4 is a horizontal sectional view taken along the line 4—4 of FIG. 2, looking in the direction of the arrows.

DESCRIPTION OF THE PREFERRED EMBODIMENT

Referring now to the drawings in detail wherein like reference characters indicate like parts throughout the several figures the reference numeral 10 indicates generally a rotary cutter head assembly for lawn mowers constructed in accordance with the invention.

The rotary cutter head assembly 10 includes a relatively flat disk 11 having a downwardly and outwardly sloping annular ring 12 integrally formed thereon. A central bore 13 is formed in the disk 11 and a pair of bores 14, 15 extend through the disk 11 closely adjacent to and on opposite sides of the bore 13.

A generally flat bar 16 extends across the disk 11 in contact therewith and has downwardly sloping opposite end portions 17, 18 in contact with the annular ring 12.

A second bar 19 extends perpendicularly to the bar 16 and is in contact with the upper surface thereof. The bar 19 has downwardly sloping opposite end portions 20, 21 which are arranged in contact with the annular ring 12. A bore 22 is formed centrally in the bar 16 and a bore 23 is arranged centrally in the bar 19 with the bores 13, 22 and 23 arranged in axially aligned relation to receive an engine shaft (not shown) adapted to extend therethrough. The bar 19 also has a pair of bores 24, 25, extending therethrough in axially aligned relation to the bores 14, 15 in the disk 11. The bores 14, 24 and 15, 25 are adapted to receive aligning drive pins (not shown) forming part of the engine shaft on which the assembly 10 is mounted. A downwardly sloping annular ring 26 having a diameter equal to the diameter of the ring 12 on the disk 11 is positioned in contact with the upper surfaces of the downwardly sloping outer end portions 17, 18 of the bar 16 and 20, 21 of the bar 19. A pair of rivets 27 extend through the rings 12, 26 and through each of the end portions 17, 18, 20, 21.

A plurality of radially extending air impeller blades 28 are secured to the ring 26 by a pair of rivets 29.

A plurality of generally triangular cutter blades 30 are positioned between the annular rings 12, 26 and are pivotally secured therein by a rivet 31. A stop rivet 32 extends through the annular rings 12, 26 adjacent each of the cutter blades 30 to support the cutter blade 30 in extended position as can be best seen in FIG. 4. The cutter blade 30 has its leading edge sharpened at 33 to provide a cutting edge. The cutter blade 30 is loosely mounted on the pivot 31 so that it can retract to the dotted line position as seen in FIG. 4 upon striking an unyielding object.

The disk 11 with its ring 12, the bars 16, 19, the ring 26 and the air impellers 28 are all formed of relatively soft steel while the cutter blades 30 are formed of tempered steel. The cutter blades 30 are positioned adjacent the ends of the bars 16, 19 so that when pivoted inwardly by striking an object they contact the bars 16, 19 which serve as a stop. In its innermost position the cutter blade 30 is so arranged on the pivot 31 (see FIG. 4) that centrifugal force will move it outwardly. The stop 32 supports the blade 30 so that the cutting edge is at a slight angle to the radius to give better cutting action.

The disk 11 prevents grass and other objects from moving upwardly between the blades 16, 19 so as to prevent clogging. The disk 11 also serves as a flywheel to provide easier engine starting and reduced maintenance.

In the use and operation of the invention the assembly 10 is mounted on the vertical shaft of an engine with one or more guide pins extending through the bores 24, 25. The assembly 10 is rotated by the engine with the air impellers 28 creating a suction to draw the grass up into the cutter blades 30 as well as to blow the cut grass out of the mower. The cutter blades 30 revolving at high speed remain in their extended position due to centrifugal force until they strike an unyielding object, such as a rock, whereupon they retract to the dotted line position as seen in FIG. 4. The blades 30 immediately under centrifugal force return to their cutting position for further cutting.

Having thus described the preferred embodiment of the invention it should be understood that numerous structural modifications and adaptations may be resorted to without departing from the spirit of the invention.

What is claimed is:

1. A rotary cutter head assembly comprising a generally flat disk, a downwardly and outwardly sloping annular ring integrally carried by said disk, a pair of crossed bars on said disk in contact with said ring, a second annular downwardly sloping ring secured to said first annular ring with said second ring arranged in upwardly equi-spaced relation to said first ring and a plurality of blades pivotally mounted between said rings for movement from a position extending beyond said rings to a position between said rings, with said bars limiting the inward movement of said blades.

2. A device as claimed in claim 1 wherein air impeller means are secured to said second annular ring and extend upwardly therefrom.

3. A device as claimed in claim 2 wherein stop means on said annular rings limits the outward pivotal movement of said cutter blades.

4. A device as claimed in claim 1 wherein said cutter blades are substantially triangular in shape and have the leading edge thereof sharpened to a cutting edge.

5. A device as claimed in claim 4 wherein said cutter blades are formed of tempered steel and the cutting edge thereof is at a slight trailing angle to the radius of said disk when in fully extended position.

References Cited

UNITED STATES PATENTS

| | | | |
|---|---|---|---|
| 2,225,139 | 11/1940 | Urschel | 56—295 |
| 2,529,797 | 11/1950 | Cauble | 56—295 |
| 2,654,986 | 10/1953 | Gold | 56—295 |
| 2,716,323 | 8/1955 | Ford | 56—295 |

RUSSELL R. KINSEY, Primary Examiner